United States Patent
Weibling et al.

(10) Patent No.: US 7,871,108 B2
(45) Date of Patent: Jan. 18, 2011

(54) MACHINE MOUNT

(75) Inventors: Danny L. Weibling, Metamora, IL (US); Billy R. Bedford, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 201 days.

(21) Appl. No.: 12/045,440

(22) Filed: Mar. 10, 2008

(65) Prior Publication Data

US 2009/0218841 A1  Sep. 3, 2009

Related U.S. Application Data

(60) Provisional application No. 61/032,686, filed on Feb. 29, 2008.

(51) Int. Cl.
*B62D 21/00* (2006.01)
*B62D 27/06* (2006.01)

(52) U.S. Cl. .................. 280/781; 180/312; 411/339; 411/180

(58) Field of Classification Search .......... 180/232, 180/299, 300, 311, 312; 280/124.109, 781; 248/674, 675; 296/203.02; 411/338, 339, 411/180
See application file for complete search history.

(56) References Cited

U.S. PATENT DOCUMENTS

| | | | | |
|---|---|---|---|---|
| 3,418,012 A * | 12/1968 | La Torre et al. | .......... | 403/408.1 |
| 3,682,508 A * | 8/1972 | Briles | .......... | 411/176 |
| 4,012,884 A * | 3/1977 | Pagel | .......... | 403/408.1 |
| 4,142,701 A * | 3/1979 | Fujii et al. | .......... | 248/544 |
| 4,283,091 A * | 8/1981 | Enders | .......... | 301/35.622 |
| 4,376,333 A * | 3/1983 | Kanamaru et al. | .......... | 29/432 |
| 4,740,124 A * | 4/1988 | Pearson et al. | .......... | 411/88 |
| 5,888,012 A * | 3/1999 | Nygren et al. | .......... | 403/13 |
| 6,386,309 B1 * | 5/2002 | Park | .......... | 180/300 |
| 6,431,602 B1 * | 8/2002 | Ralko et al. | .......... | 280/781 |
| 6,789,993 B2 * | 9/2004 | Ozawa et al. | .......... | 411/546 |
| 6,910,671 B1 * | 6/2005 | Norkus et al. | .......... | 248/635 |
| 2004/0026153 A1 * | 2/2004 | Dershem et al. | .......... | 180/311 |
| 2004/0115026 A1 * | 6/2004 | Sommer et al. | .......... | 411/180 |

OTHER PUBLICATIONS

Yield Strength and Heat Treatment, Technology, Products, & Processes, Copyright© 2006 TPP Information Centre (available at http://www.tppinfo.com/defect_analysis/yield_strength.html).*
The Estimation of Yield Strength from Hardness Measurements, DeFries, Richard S. Watervliet Arsenal NY (Abstract).*
Correlation of Yield Strength and Tensile Strength with Hardness for Steels, E.J. Pavlina and C.J. Van Tyne Journal of Materials Engineering and Performance (Abstract).*

* cited by examiner

*Primary Examiner*—Paul N Dickson
*Assistant Examiner*—Joseph Rocca
(74) *Attorney, Agent, or Firm*—Jonathan V. Trousdale; Miller, Matthias & Hull (57) ABSTRACT

A mount for a machine includes a mounting member having an insertion portion and a shoulder portion. During assembly, the insertion portion is swaged into an opening in the frame. A mating member attached to a machine structure is seated on the shoulder portion, and a cap may be attached to the shoulder portion such that the mating member is disposed between the cap and the shoulder portion.

11 Claims, 6 Drawing Sheets

MACHINE MOUNT

CROSS-REFERENCE TO RELATED APPLICATIONS

This non-provisional U.S. Patent Application claims the benefit of U.S. Provisional Patent Application No. 61/032,686, filed on Feb. 29, 2008.

TECHNICAL FIELD

This invention relates generally to a frame of a machine and more particularly to a mount for structures attached to a frame of a machine.

BACKGROUND

Many types of machines have a primary frame on which various structures are attached; such structures may include, for example, an engine, a transmission, an implement, a pump, a secondary frame, or any other apparatus directly or indirectly supported by the primary frame. Various structures may also be attached to a secondary frame. For example, a track type tractor may have a pair of endless tracks entertained around a track roller frame, the track roller frame being an example of a secondary frame attached to a primary frame. The weight of the structures, the weight of the machine, and/or the forces generated by the structures are often transmitted to the primary and/or secondary frame by way of a mount. It is generally desirable that such mounts be durable and that the interface between the mount and the primary or secondary frame avoid or limit the introduction of structural weaknesses into such frame. It may also be desirable for a given mount to ease the assembly of a machine, particularly with regard to the mounting of the particular structure to be attached to a frame.

SUMMARY

A machine mount for attaching a structure to a frame is provided. The mount may include an insertion portion that may be inserted into an opening in the frame. The insertion portion may include a tapered swaging portion that creates a stress primarily in a radial direction in the frame and/or in the insertion portion during assembly of the mount. The mount may also include a shoulder portion that is configured to support a mating portion attached to the structure.

Additionally, a method of attaching a structure to a frame is provided. The method may include providing a mounting member that has an insertion portion, a shoulder portion, and a cavity; providing an opening in the frame; providing a mating portion attached to the structure; and providing a bolt having a head supported by the frame and a threaded portion disposed within the cavity. According to this method the insertion portion of the mounting member may be positioned proximate to the opening; then the mating portion may be seated on the shoulder portion; then the bolt may be tightened until the insertion portion is in swaged communication with the frame.

DETAILED DESCRIPTION

Figure 1:
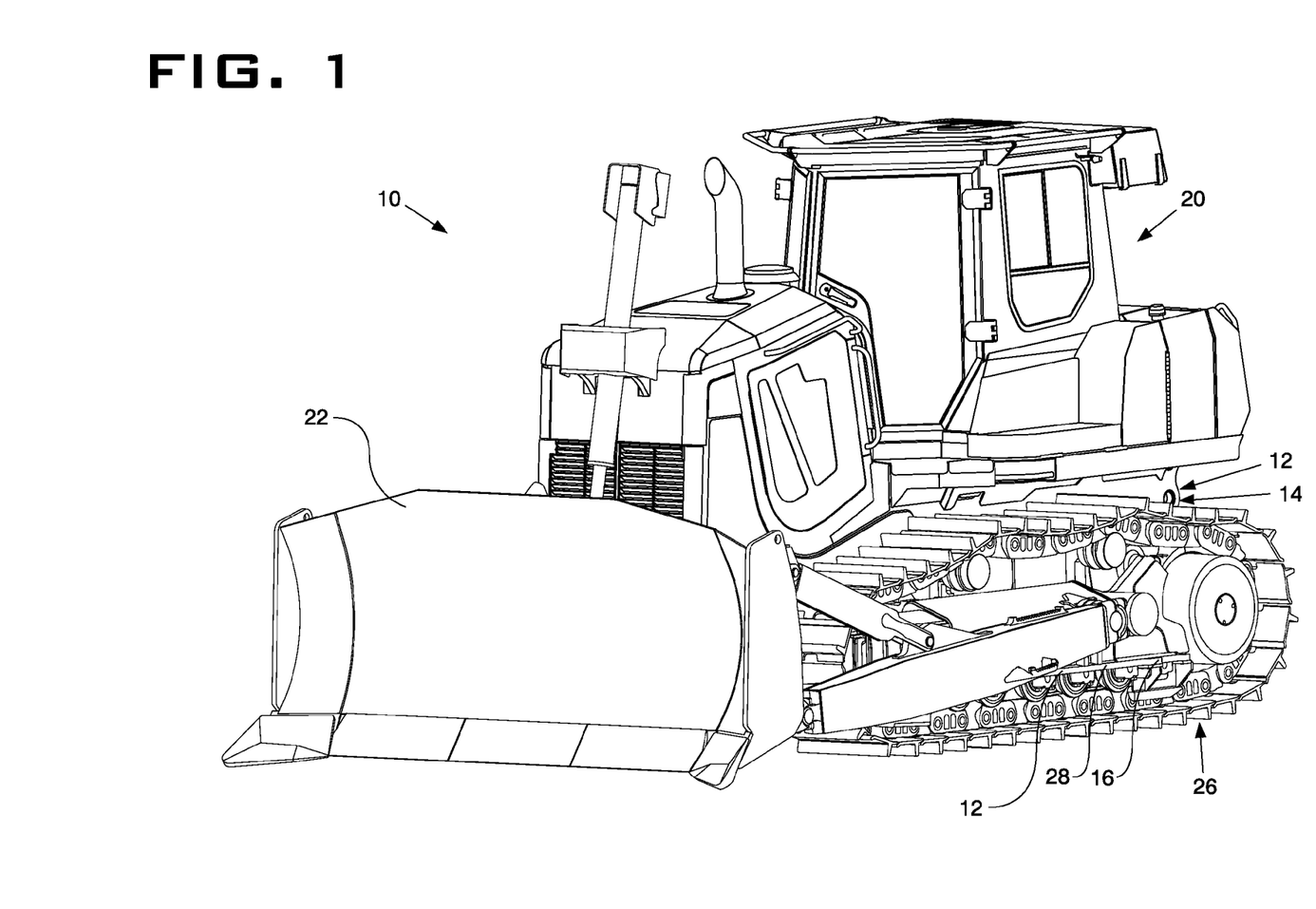
FIG. 1 is a perspective view of a machine having a frame.

Referring to FIG. 1, a perspective view illustrates a machine 10 having a frame 12. As used herein, the term "frame" refers to both a primary frame 14, which is often referred to in the art as a chassis, and a secondary frame 16, which is a frame directly or indirectly attached to the primary frame 14 and which supports one or more structures 18 attached to the machine 10. As used herein the term "structure" 18 refers to any apparatus directly or indirectly attached to the primary frame 14, such as a secondary frame 16, an engine 21 (FIG. 6), a pump (not shown), a transmission (not shown), a cab 20, an implement 22, and so forth; accordingly, a secondary frame 16 is both a frame 12 and a structure 18.

In the exemplary embodiment illustrated in FIG. 1, the machine 10 is shown as being a track type tractor having an implement 22 such as a blade, and a pair of endless tracks 26 being entrained about a secondary frame 16 known in the art as a track roller frame 28. However it should be understood that the machine 10 may also be, for example, a compactor, a wheeled dozer, a skidder, a wheel loader, a tracked loader, a crane, or any other machine known to one skilled in the art. Alternatively, the implement 22 may be a bucket, or be attached to another system such as a variable pitch power angle and tilt blade system commonly referred to as a VPAT configuration. The machine 10 may also include a cab 20 or a roll over protection system or ROPS (not shown).

Figure 2:
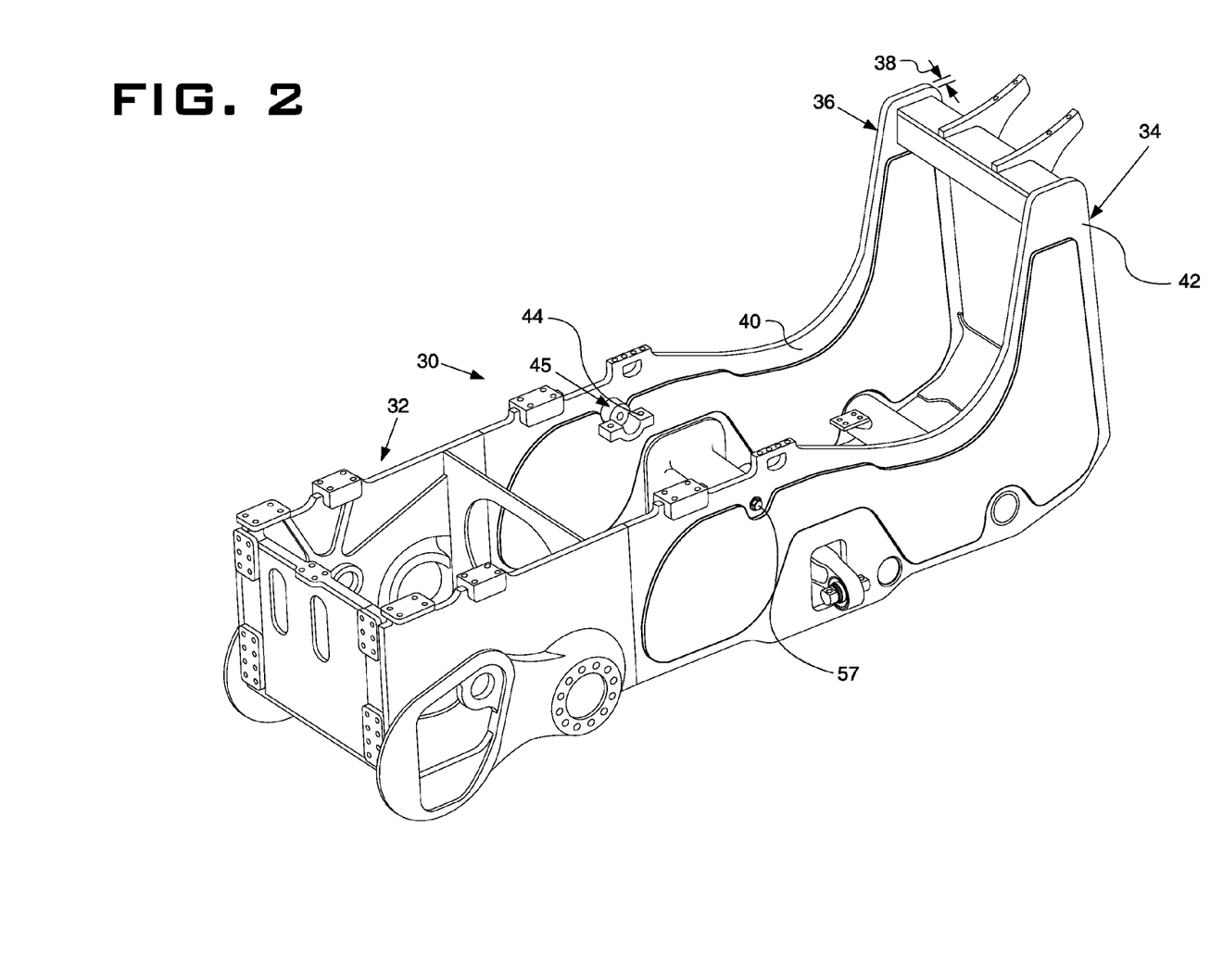
FIG. 2 is a perspective view of a frame.

Referring to FIG. 2, a perspective view illustrates the primary frame 14 of the machine 10 illustrated in FIG. 1. As shown, the primary frame 14 may include a first section 30 and a second section 32. The first section 32 may be used to support an engine 21 and/or radiator (not shown), as well as to receive loads from the implement 22, the track roller frame 28, and other structures 18. The second section 32 may be used to support power train components such as, a transmission (not shown), electric motors and generators (not shown), pumps (not shown), or other such structures 18 known in the art.

The first and second sections 30, 32 may be manufactured from steel plate, cast materials, and/or composite materials. Additionally, the first and second sections 30, 32 may be welded together and/or attached by adhesives or fasteners.

The first section 30 may include a first plate member 34 and a second plate member 36. As shown, the first and second plate members 34, 36 may be made of substantially solid plate having a predetermined thickness 38 that includes an inner side 40 and an outer side 42. Alternatively, the first and second plate members 34, 36 may each include an inner wall 35 (FIG. 5) and an outer wall 37 (FIG. 5) separated by a predetermined distance. As shown, the first and second plate members 34, 36 may be secured together in lateral spaced, substantially parallel relationship to one another.

The first section 30 may include a mount 44 for attaching a structure 18, such as an engine 21, to the primary frame 14. The mount 44 may be attached to the first and second plate members 34, 36 in order to facilitate mounting an engine 21 to the first section 30 of the primary frame 14. In the exemplary embodiment, the mount 44 may include a mounting member 45 such as a shouldered pin 46, which may best be seen in FIGS. 3 and 4. Two shouldered pins 46 may be provided, one attached to the first plate member 34 and the other attached to the second plate member 36.

Figure 3:
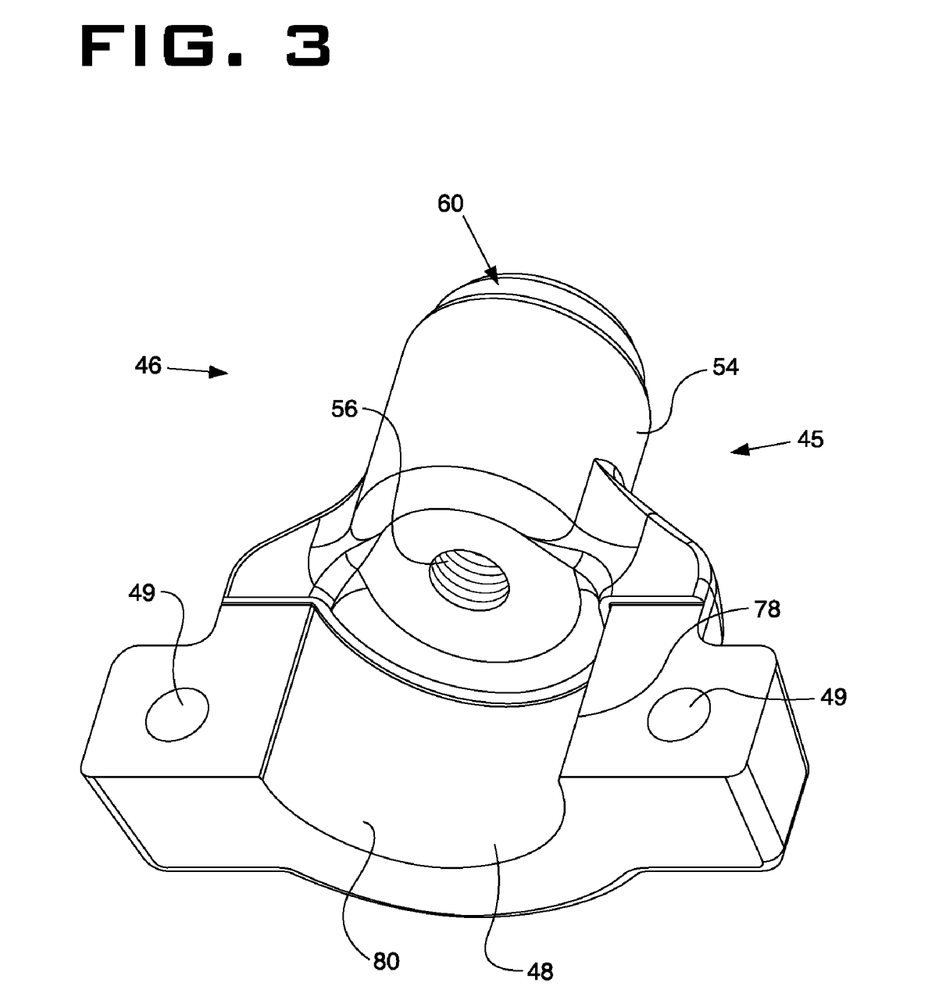
FIG. 3 is a perspective view of a mounting member.
Figure 4:
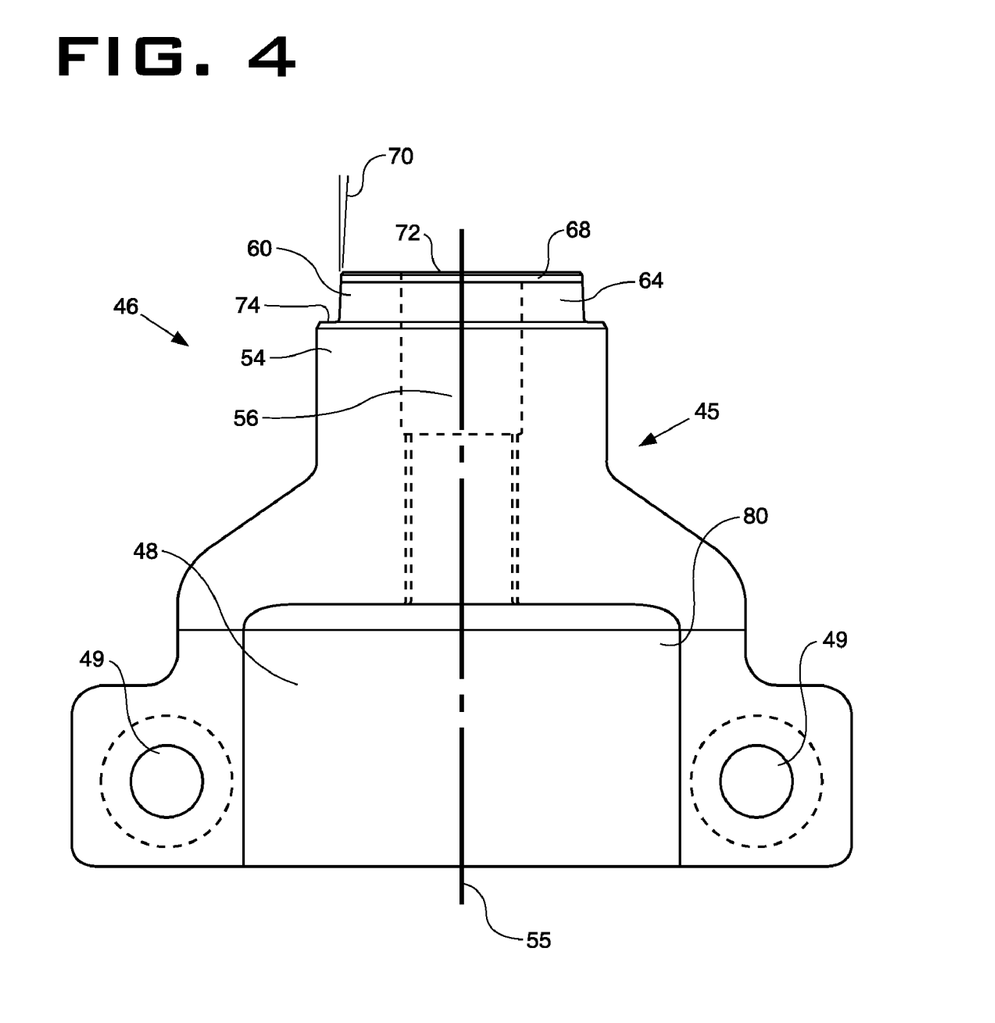
FIG. 4 is a plan view of a mounting member.

Referring to FIGS. 3 and 4, a mounting member 45 in the form of a shouldered pin 46 is illustrated. The shouldered pin 46 may include a shoulder portion 48 configured to support a mating portion 50 (FIG. 6) attached to or integral with a structure 18. The mating portion 50, may include, for example, a cylindrical pin attached to an engine 21. The mating portion 50 may also be rigid, be elastomeric, or have both rigid and elastomeric components.

The shoulder portion 48 may also be configured to receive a cap 52 (FIG. 6), such that, when assembled, the mating portion 50 is secured between the shoulder portion 48 and the cap 52. The cap 52 may be attached to the shoulder portion 48 by bolts, clamps, or any other means of attachment known in the art. In the illustrated embodiment, corresponding holes 49 may be provided in both the shoulder portion 48 and the cap 52 for attachment by way of bolts.

According to one embodiment, the mating portion 50 may include a rubber core surrounded by a metal. The mating portion 50 may also have a larger cross sectional area than the cross sectional area defined by the space between shoulder portion 48 and the cap 52. Thus, according to this embodiment, the mating portion 50 may be compressed by the attachment of the cap 52 to the shoulder portion 48.

The shouldered pin 46 may also include a body portion 54. As shown in FIG. 4, the body portion 54 may include a cavity 56 to facilitate the coupling of an attachment structure, such as a bolt 57 (FIG. 1, FIG. 5), to the shouldered pin 46. The bolt 57 may have a head 65 that is supported, directly or indirectly, by the frame 12, and a threaded portion 67 that is disposed within the cavity 56. The cavity 56 may pass axially through either a portion of or the entirety of the body portion 54. As used herein, an axial direction is a direction generally parallel with the axis 55 illustrated in FIGS. 4 and 5; conversely, a radial direction is a direction substantially perpendicular to an axial direction. The cavity 56 may also be threaded such that the bolt 57 may be threadedly engaged with the cavity 56. Alternatively, the cavity 56 may be substantially smooth and the bolt 57 may be coupled to the shouldered pin 46 by way of a nut (not shown). The cavity 56 may also extend through the insertion portion 60, which is discussed below.

As shown in FIGS. 3 and 4, the shouldered pin 46 may include an insertion portion 60, which may best be seen in FIG. 4. The insertion portion 60 may be configured to be disposed within an opening 62 in a frame 12, such as, for example, the primary frame 14. The opening 62 in the frame 12 may be created by any means known in the art, such as by forming, machining or boring a hole in the frame. Alternatively, the opening 62 in the primary frame 14 may be defined by an insert attached to the frame, such as by a welded-in tube 63 (FIG. 5) or bushing, in which case the inner-diameter of the welded-in tube 63 would define the opening 62. As used herein, such an insert, welded-in tube 63 or bushing is considered part of the frame 12. The opening 62 may also include a chamfer on the inner side 40 of the respective first or second plate member 34, 36 to assist in positioning insertion portion 60 for insertion into the opening 62.

The insertion portion 60 of the shouldered pin 46 may include a swaging portion 64 and a non-swaging portion 68. As used herein, "to swage" means to create a strain in a mounting member 45 and/or in a frame 12 by application of a force to the mounting member 45, such strain being primarily in a direction perpendicular to the force applied to the mounting member 45. Accordingly, the swaging portion 64 may be swaged into the frame 12 during assembly of the mount 44. The non-swaging portion 68 may not necessarily be swaged during assembly of the mount 44. Furthermore, a mounting member 45 and a frame 12 are in swaged communication when a swaging portion 64 of the mounting member 65 has been swaged in the frame 12, and a compressive force resulting from the swaging is maintained between the mounting member 65 and the frame 12. In one embodiment the mounting member 45 may be swaged into the frame 12 at ambient temperature.

The swaging portion 64 may gradually taper at a given angle 70. According to one embodiment the angle 70 may be between two degrees (2°) and six degrees (6°), inclusive. According to another embodiment the angle 70 may be between three degrees (3°) and five degrees (5°), inclusive. In another embodiment, the angle 70 may be approximately four degrees (4°). In yet another embodiment, the angle may be approximately four degrees (4°) and the swaging portion may be between fourteen and eighty-five one-hundredths millimeters (14.85 mm) and fifteen and fifteen one-hundredths millimeters (15.15 mm), inclusive. In some cases the angle 70 may range from one degree (1°) to ten degrees (10°), inclusive. For the purpose of clarity, values of the angle 70 presented herein refer to the angle 70 of the swaging portion 64 prior to assembly, and thus prior to swaging. Swaging may alter the value of the angle 70.

The insertion portion 60 may further consist of a guide portion 72. The guide portion 72 may taper more severely than the swaging portion 64 to assist in properly positioning insertion portion 60 for insertion into opening 62. According to one embodiment, guide portion 72 tapers at approximately forty-five degrees (45°). Alternatively, the insertion portion 60 may have neither a non-swaging portion 68 nor a guide portion 72, and consist entirely of the swaging portion 64.

The shouldered pin 46 may also include a rim 74 between the insertion portion 60 and the body portion 54. The rim 74 may be characterized by an abrupt change in the diameter of the shouldered pin 46 between the insertion portion 60 and the body portion 54.

Figure 5:
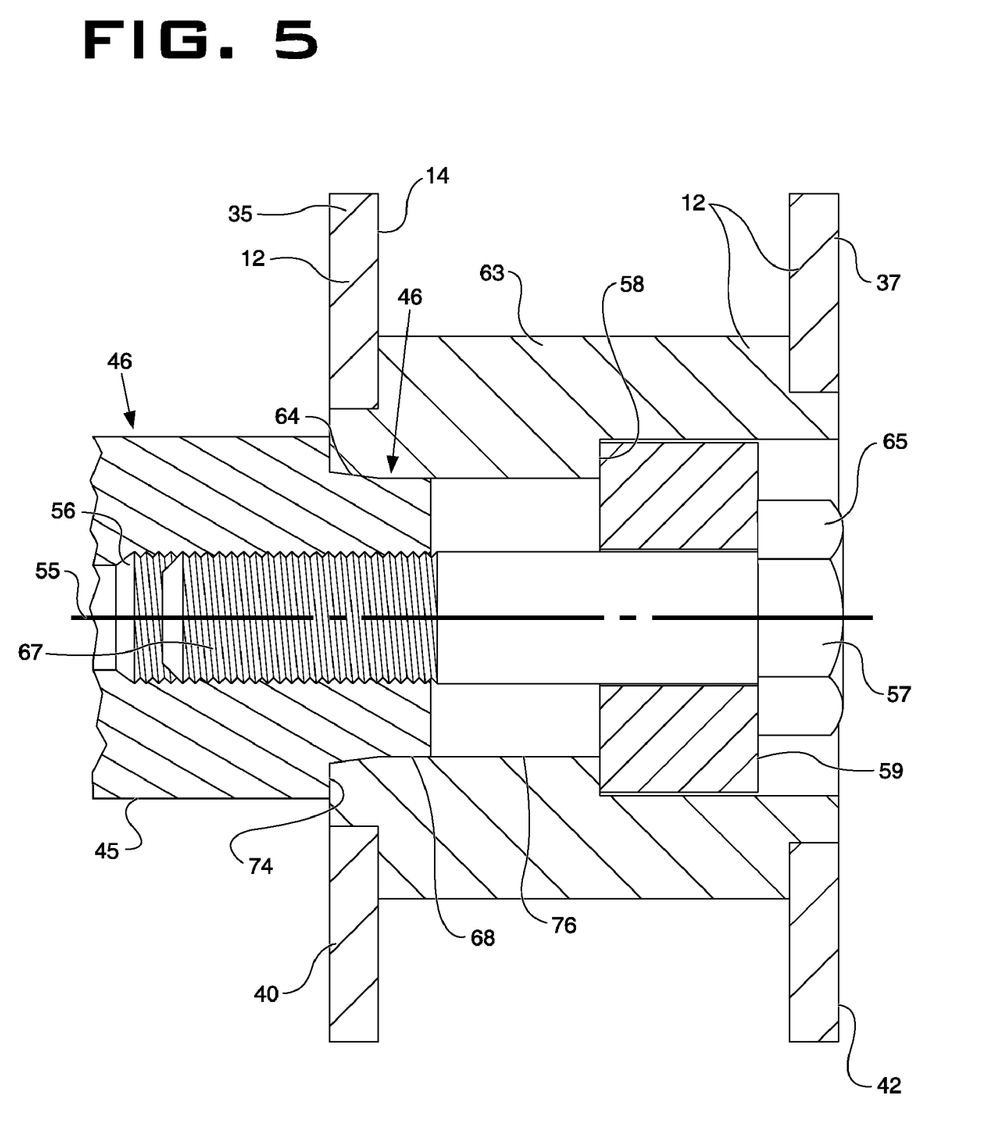
FIG. 5 is a cross-sectional view of a mounting member attached to a frame.

FIG. 5 illustrates a cross-sectional view of an exemplary assembly of a mounting member 45, illustrated as a shouldered pin 46, attached to a frame 12, illustrated as a primary frame 14. The exemplary assembly illustrated in FIG. 5 shows the shouldered pin 46 in swaged communication with the frame 12.

As illustrated, the bolt 57 may be threadedly engaged with the cavity 56. The head of the bolt 57 may be restrained from axial movement toward the inner side 40 by an annular washer 59, which may, in turn, be restrained from axial movement toward the inner side 40 by a shelf 58. The shelf 58 may result from an abrupt change in the diameter of the opening 62. Alternatively, the head of the bolt 57 may rest directly on the shelf 58, the head of the bolt 57 may rest on the outer side 42 of the frame 12, or the head of the bolt 57 may rest on a washer 59, which, in turn, rests on the outer side 42 of the frame 12. As illustrated, the opening may also include a cylindrical portion 76 having a substantially constant diameter prior to assembly; however, the diameter of the cylindrical portion 76 may be altered during assembly due to swaging.

The non-swaging portion 68 may have a diameter slightly less than the diameter of the opening 62. The swaging portion 64 may be tapered at an angle 70 such that it has a diameter that is increasingly larger than the diameter of the cylindrical portion 76 of the opening 62 prior to assembly. However, as the bolt 57 is tightened during assembly, the bolt 57 may create a tensile force acting on the insertion portion 60 in the axial direction, which may cause insertion portion 60 to be drawn further into the opening 62. Due to the interaction between the swaging portion 64 and the frame 12 proximate to the opening 62, a compressive force is created between the swaging portion 64 and the frame 12 acting primarily in the radial direction. Accordingly, this primarily radial compressive force may cause a primarily radial strain in the frame 12 proximate to the opening 62 and/or in the swaging portion 64 of the mounting member 45.

According to one embodiment, the swaging portion 64 of the mounting member 45 may have a significantly higher yield strength than the frame 12 proximate to the opening 62. For example, the frame 12 proximate to the opening 62 may have a yield strength between two-hundred and ninety megapascals (290 MPa) and four-hundred and fifty megapascals (450 MPa), inclusive; and the swaging portion 64 may have a yield strength between six-hundred and fifty megapascals (650 MPa) and eight-hundred and twenty megapascals (820 MPa), inclusive. According to another embodiment, the yield strength of the swaging portion 64 may be greater than twice the yield strength of the frame 12 proximate to the opening 62. According to yet another embodiment, swaging the mounting member 45 in the frame 12 may cause the frame 12 proximate to the opening 62 to experience significantly higher strain than the strain experienced by the swaging portion 64. According to still another embodiment, swaging the mounting member 45 in the frame 12 may cause plastic deformation of the frame 12, while causing no plastic deformation of the swaging portion 64.

In an alternative embodiment of an assembly attaching the shouldered pin 46 to the primary frame 14, the swaging portion 64 may have a substantially constant diameter, while the opening 62 may taper at a predetermined angle. That is to say, the opening 62 may be wider near the inner side 40 and smaller near the outer side 42. Accordingly, as the bolt 57 is tightened during assembly, the taper of the opening 62 may result in a radial compressive force acting on the swaging portion 64, which may lead to a primarily radial strain in the swaging portion 64 and/or the frame 12.

In yet another embodiment, both the opening 62 and the swaging portion 64 may taper at predetermined angles.

Figure 6:
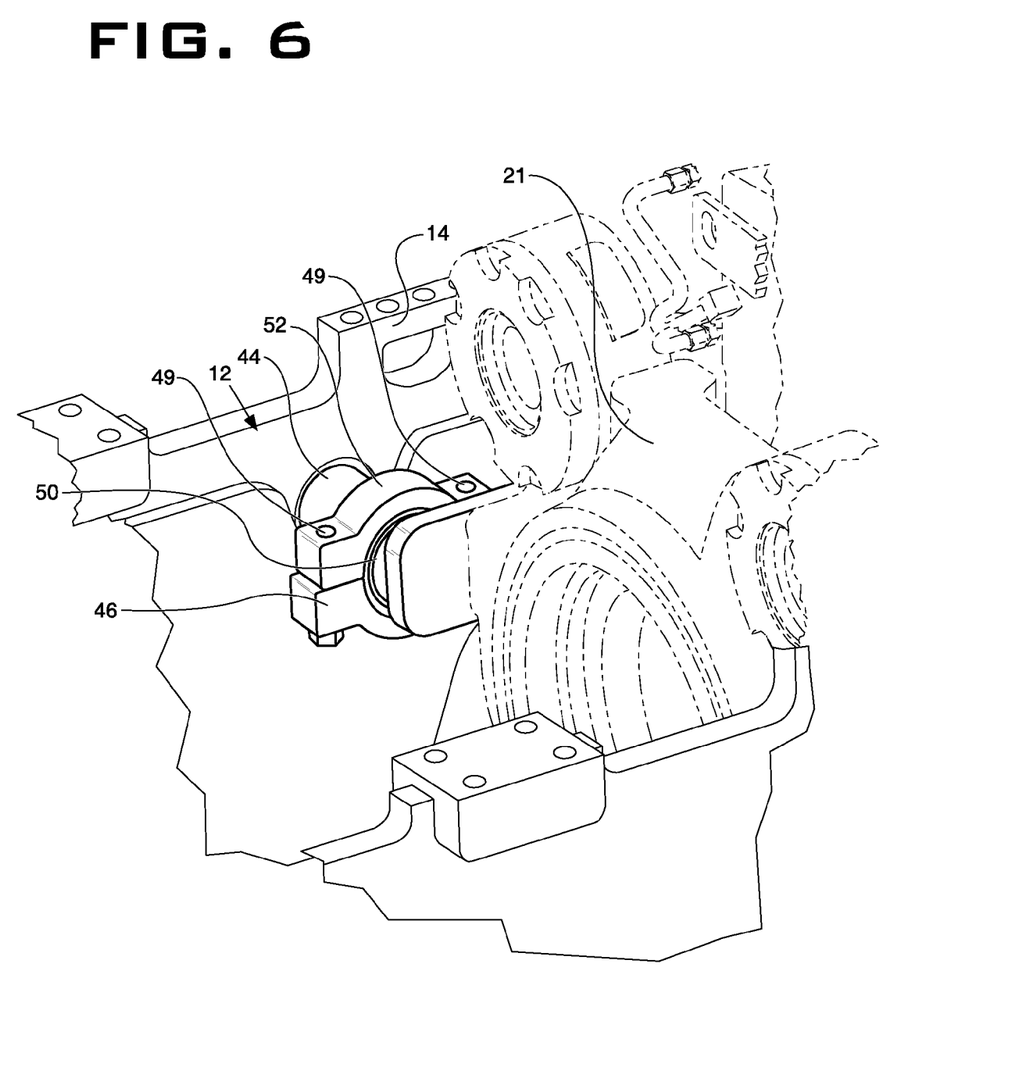
FIG. 6 is a perspective view illustrating an engine mounted to a primary frame.

FIG. 6 illustrates a perspective view of an exemplary mount 44 attaching an engine 21 to a primary frame 14. During assembly and disassembly of the engine 21 to the primary frame 14, the mounting member 45 may be rotated, which may, among other things, simplify the mounting of the structure 18. During assembly, it may be desirable to rotate the mounting member 45 prior to placing the mounting member 45 and frame 12 into swaged communication and/or prior to applying a load to the mounting member 45. During disassembly, it may be desirable to rotate the mounting member 45 after disengaging the mounting member 45 from swaged communication with the frame 12 and/or after reducing the load on the mounting member 45.

For example, when attaching an engine 21 to a primary frame 14 using a shouldered pin 46 as a mounting member 45, it may be desirable, due to manufacturing constraints, to reduce the minimum height that the engine 21 must be lifted at the time the mating portion 50 attached to the engine 21 is seated on the shoulder portion 48 of the mounting member 45. By rotating the shouldered pin 46, the height of the lip 78 (FIG. 3) that must be cleared by the mating portion 50 may be reduced. For example, if the mating portion is to be seated on a substantially semi-circular seat 80 on the shoulder portion 48 of the shouldered pin 46, the semi-circular seat 80 having a radius, by rotating the shouldered pin 46 forty-five degrees (45°), the height of the lip 78 that must be cleared by the mating portion 50 may be reduced by approximately seventy-one percent (71%) of such radius.

Once the mating portion 50 is seated, the shouldered pin 46 may then be rotated back to a level position, as illustrated in FIG. 6, or the shouldered pin 46 may be left in a rotated position. Once the mating portion 50 is seated on the shoulder portion 48 and the shouldered pin 46 is rotated to a desired position the cap 52 may be attached to the shoulder portion 48 and the bolt 57 may be tightened. The tightening of the bolt 57 may place the insertion portion 60 into swaged communication with the primary frame 14 proximate to the opening 62. Once the insertion portion 60 is in swaged communication with the primary frame 14, the shoulder portion 48 may receive the weight of the engine 21 and other forces generated by or acting on the engine 21. Consequently, the load from the engine 21 may be transmitted from the engine 21 to the mating portion 50, then to the shouldered pin 46, and then to the primary frame 14.

Consequently, a method for attaching a structure 18, such as an engine 21, to a frame 12, such as a primary frame 14, may include: positioning an insertion portion 60 of a mounting member 45 proximate to and aligned with an opening 62 on the inner side 40 of the frame 12; placing a bolt 57 into a cavity 56 in a body portion 54 of a mounting member 45; rotating the mounting member 45 from an original position to a rotated position to reduce the height of the lip 78; seating a mating portion 50 in a shoulder portion 48 of the mounting member 45; rotating the mounting member 45 from a rotated position to an original position; attaching a cap 42 to the shoulder portion 48, such that the mating portion 50 is disposed between the cap 42 and the shoulder portion 48; tightening the bolt 57 to swage the mounting member 45 and frame 12; continuing to tighten the bolt 57 until the rim 74 rests against the inner side 40 of the frame 12; and applying a load to the mounting member 45.

Furthermore a method of detaching a structure 18, such as an engine 21, from a frame 12, such as a primary frame 14, may include: reducing the load applied to the mounting member 45; loosening the bolt 57; applying a force to the bolt 57 to disengage the mounting member 45 and frame 12 from swaged communication, such as by way of striking the head of the bolt with an object; removing the cap 52 from the shoulder portion 48; rotating the mounting member 45; and unseating the mating portion 50 from the shoulder portion 48.

INDUSTRIAL APPLICABILITY

In accordance with the disclosure above a durable mount 44 that may ease machine 10 assembly and/or avoid or limit the introduction of structural weaknesses into a frame 12 of such machine 10 is provided. As discussed above, during assembly the mounting member 45 may be rotated to reduce the effective height of the mount 44 that must be cleared by a mating portion 50 of a structure 18. This may be particularly beneficial if and when there are other structures 18 already in place that need to be circumvented during installation of the structure 18 to be mounted.

The disclosed mount 44 may also be beneficial because the insertion portion 60 of the mounting member 45 and the opening 62 form a very tight connection, due to the swaging, yet can be made using easy to manufacture tolerances. Additionally, the disclosed mount 44 may avoid or reduce stress-risers that can form on the inner side 40 of the first and second plate members 34, 36 when conventional shelf mounts are used.

After installation, the swaged joint between the insertion portion 60 and the frame 12 proximate to the opening 62 may take most or all of the load from the structure 18, thereby, reducing or eliminating the load experienced by the bolt 57.

Also, if desired, the disclosed mount 44 may be disassembled, rotated and reinstalled without harm to the frame 12 or the mounting member 45.

It will be apparent to those skilled in the art that various modifications and variations can be made without departing from the scope or spirit of the disclosed mount. Additionally, other embodiments of the disclosed mount 44 will be apparent to those skilled in the art from consideration of the specification and practice of the apparatus and method disclosed herein. It is intended that the specification and examples be considered as exemplary only.

What is claimed is:

1. A mount for attaching a structure to a frame of a machine, the mount comprising:
    an insertion portion configured for insertion into an opening in the frame, wherein the insertion portion includes a swaging portion that tapers at a predetermined angle between two degrees and six degrees, inclusive;
    a shoulder portion having a seat shaped to receive a mating portion of the structure, the seat terminating in a lip, the insertion portion and shoulder portion being rotatable in the opening in the frame from a first position to a second position, the lip being lower in the second position than in the first position.

2. The mount of claim 1, wherein the structure is an engine and the frame is a primary frame.

3. The mount of claim 2, wherein the yield strength of the frame proximate to the opening is between two-hundred and ninety megapascals and four-hundred and fifty megapascals, inclusive; and the yield strength of the swaging portion is between six-hundred and fifty megapascals and eight-hundred and twenty megapascals, inclusive.

4. The mount of claim 1, wherein the predetermined angles is approximately four degrees.

5. The mount of claim 4, wherein the swaging portion is between fourteen and eighty-five one-hundredths millimeters and fifteen and fifteen one-hundredths millimeters, inclusive.

6. The mount of claim 1, wherein the insertion portion has a yield strength greater than the yield strength of the frame proximate to the opening.

7. A machine including an engine and a primary frame, the machine comprising:
    a mounting member having a shoulder portion and an insertion portion, the shoulder portion including a recessed seat terminating in a lip;
    an opening in the primary frame; and
    a mating portion attached to the engine and mounted in and supported by the recessed seat;
    wherein the insertion portion is rotatably disposed in the opening from a first position to a second position, the lip being lower in the second position, and the insertion portion is in swaged communication with the frame.

8. The machine of claim 7, wherein the insertion portion has a higher yield strength than the frame proximate to the opening.

9. The machine of claim 7, wherein the yield strength of the frame proximate to the opening is between two-hundred and ninety megapascals and four-hundred and fifty megapascals, inclusive; and the yield strength of the insertion portion is between six-hundred and fifty megapascals and eight-hundred and twenty megapascals, inclusive.

10. The machine of claim 9, wherein the insertion portion includes a swaging portion that tapers at a predetermined angle between one degree and ten degrees.

11. The machine of claim 10, wherein the predetermined angles is between three degrees and five degrees.

* * * * *